UNITED STATES PATENT OFFICE.

ADOLPH W. H. LENDERS AND HANS F. BAUER, OF CEDAR RAPIDS, IOWA, ASSIGNORS, BY MESNE ASSIGNMENTS, TO PENICK & FORD, LTD., INCORPORATED, A CORPORATION OF DELAWARE.

METHOD OF MAKING SOLUBLE STARCH PRODUCTS.

1,418,311.          Specification of Letters Patent.      Patented June 6, 1922.

No Drawing.        Application filed July 2, 1917. Serial No. 178,214.

*To all whom it may concern:*

Be it known that we, ADOLPH W. H. LENDERS and HANS F. BAUER, citizens of the United States, residing at Cedar Rapids, in the county of Linn and State of Iowa, have invented certain new and useful Improvements in Methods of Making Soluble Starch Products, of which the following is a specification.

Our invention relates to a novel starch product and a method of manufacturing the same. The product consists essentially of modified starch in dry form which is wholly, or to a very large extent, soluble in cold water.

The product is useful as a textile size, a paper coating, yeast food, as a malt substitute in the brewing or kindered industries, and also in the manufacture of cold water paints, vegetable glues or pastes, and as an ingredient of food products, such as predigested breakfast foods. It is a non-hygroscopic, dry material, flaky or pulverulent in character, and may, therefore, be transported and handled with convenience. It will not deteriorate under ordinary conditions.

The characteristic feature of our product is that it is essentially, and to all intents and purposes, wholly starch. It reacts with iodine to give a blue color, indicating that the product is starch and contains no appreciable amount of dextrine. It, therefore, differs fundamentally from a product intermediate starch and glucose in which part of the starch is dextrinized and a part converted into sugar. The product of our invention, although modified so as to become soluble and readily fermentable, remains starch.

The product is preferably produced as follows: Starch is treated by any suitable method employed for making modified or thin boiling starch to produce a modified starch having preferably the maximum degree of fluidity. By the term "modified starch" is intended starch which has been treated by any of the usual methods, most frequently by subjecting the raw starch to heat in the presence of an acid so as to give the product a degree of fluidity, when boiled with water, which ordinary raw starch does not have. In accordance with our invention the starch thus modified is then subjected to heat in the presence of water for the purpose of producing gelatinization of the starch, that is, a disruption of the starch cells, and thereafter bringing about a further change which gives the product its solubility.

Preferably the modified starch is first cooked at a boiling temperature with water at a density of about fifteen degrees Baume', which produces the gelatinization or disruption of the starch cells. It is then subjected to a higher temperature in such manner as to make the product soluble and at the same time reduce it to a dry state. For example, the gelatinized starch having an acidity of approximately .015 may be passed in a thin film over a heated surface such as the surface of a metal roll heated interiorly with steam to a temperature of 315° Fahrenheit, the period of contact with the roll being about five seconds. The resultant material will, in such case, be in the form of a thin, somewhat brittle or friable sheet which is dry and flaky and breaks up into small pieces as it is removed from the drying surface. The treatment of the starch at the high temperature might be accomplished by reducing the starch liquor to a spray and subjecting the same to heat. The product, in this case, will be pulverulent or finely granular in form.

It is possible to omit the cooking and boiling step. In such case the modified starch, mixed with water, is subjected immediately to a temperature sufficiently high to effect the change in the starch necessary to give the product the desired solubility. For example, the modified starch, mixed with water, may be subjected to heat while in the form of a spray.

In either of the methods of treatment above described, the previously modified starch undergoes certain changes, towit: It is first gelatinized by application of heat and thereafter, when subject to the same or a subsequent heat treatment, undergoes a certain further modification which renders it soluble in cold water, by which is meant water at normal atmospheric temperatures, say seventy degrees Fahrenheit, or thereabouts. The change in the starch which gives it this solubility takes place apparently while the moisture is being expelled. It requires a temperature higher than the boiling temperature of the starch liquor. The presence of water is necessary in this operation, otherwise dextrinization will take place to a certain extent at least.

The product will be found, on testing, to consist wholly of starch although it is amorphous. It gives the starch reaction when subjected to the usual tests. For example, it gives a dark blue color with iodine. It is soluble in cold water, to a very considerable extent at least, the degree of solubility depending on the character of the treatment. It is readily fermentable.

By describing the material as "dry" we do not mean that it need be perfectly anhydrous. Our product is dry, at least in the ordinary commercial acceptation of the term.

We claim:

The method of manufacturing the product specified which consists in first making a water solution of modified or thin boiling starch by the usual process of acid hydrolysis, then subjecting such solution without added ingredients to a temperature which instantaneously evaporates the water and further modifies the starch.

ADOLPH W. H. LENDERS.
HANS F. BAUER.